W. S. HILL.
Combined Ice Tongs, Pick, and Hatchet.

No. 222,186. Patented Dec. 2, 1879.

WITNESSES

INVENTOR

UNITED STATES PATENT OFFICE.

WARREN S. HILL, OF HYDE PARK, MASSACHUSETTS.

IMPROVEMENT IN COMBINED ICE TONGS, PICK, AND HATCHET.

Specification forming part of Letters Patent No. 222,186, dated December 2, 1879; application filed April 24, 1879.

*To all whom it may concern:*

Be it known that I, WARREN S. HILL, of Hyde Park, county of Norfolk, and State of Massachusetts, have invented a new and useful Improvement in Combined Ice Tongs, Pick, and Hatchet, which improvement is fully set forth in the following specification.

My invention consists of making a pair of ice-tongs of such a shape that when the tongs are closed their hooked ends will be sufficiently close together to admit of their being grasped, at a slight distance from their points, with the hand, and of securing to one of the handles of said tongs, which are T-shaped, a hatchet, or a hatchet and pick combined, so that when the tongs are closed, and the hooked ends are grasped within the hand, the hatchet will appear to be grasped between the handles of the tongs, and in this manner, using the closed tongs as a handle, the hatchet or pick may be used for cutting or picking the ice. The hatchet is secured to the handle by two rivets, with their heads projecting, so as to form conical points on the inner side, which points enter corresponding depressions in the opposite handle, thereby giving the strength of both handles to withstand the strain when the tool is used for cutting or picking the ice.

My invention will be readily understood by reference to the drawings which accompany this specification, in which—

Figure 1:
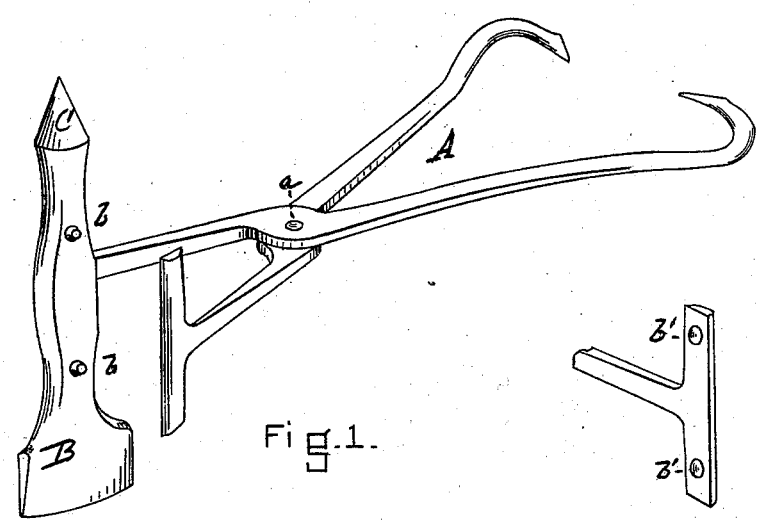

Figure 1 is a perspective, in which the arrangement of the different parts is clearly shown.

The tongs A, which consist of two similar parts, cross each other, and are secured together by the rivet $a$, upon which they have a vibrating motion, so that their two handles or points separate or approach each other simultaneously, the same as a pair of scissors.

Figure 2:
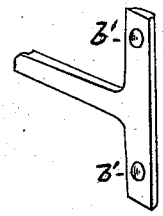
Figure 3:
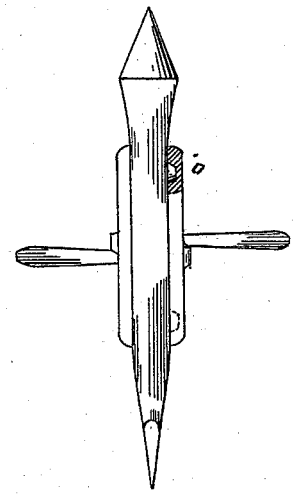

To the inner side of one of the T-shaped handles the hatchet B is provided at one end with a pick, C, secured by two rivets, whose projecting heads form conical points $b\ b$, which, when the handles are brought together, enter the depressions $b'\ b'$, (see Fig. 2,) thereby giving the united strength of the two handles upon the hatchet, when the implement is used as a hatchet or pick. Fig. 3 shows clearly the manner in which this is accomplished, a portion of the handle being broken away, showing the conical point $b$ within the corresponding depression in the handle.

As the manner of using the implement for either of its purposes is perfectly obvious, no description of its operation is necessary.

I am aware that tools designed to accomplish a similar purpose have been used, in which a hatchet with a handle or shank has two idle hooks hinged thereto, they having no adherent properties from their construction, unless used upon very large pieces, when they partake of the nature of a "sling," while smaller pieces can only be held by pressing the points together upon the piece grasped.

What I claim as new, and desire to secure by Letters Patent, is—

The combination, with the tongs A, of the hatchet B, having the pick C secured to one of its handles, and having the points $b\ b$, which enter the corresponding depressions $b'\ b'$, whereby both handles are made to support the hatchet when the tongs are closed, all substantially as shown and described.

WARREN S. HILL.

Witnesses:
 JOHN L. TOWSE,
 HERMAN ERHARD.